2,930,089
Patented Mar. 29, 1960

2,930,089
PRECISION CASTING

Harold Garton Emblem, Mickleover, Derby, and Jack Aston, Melbourne, Derby, England, assignors to Rolls-Royce Limited, Derby, England, a company of Great Britain No Drawing. Application November 26, 1956
Serial No. 624,229

Claims priority, application Great Britain
December 16, 1955

12 Claims. (Cl. 22—193)

This invention relates to improvements in the preparation of molds and cores for use in metal casting processes. Such processes include those of the kind in which a mold structure is formed around an expendable pattern such as a wax pattern, which may incorporate a preformed core element, together with processes of the kind in which a mold structure is formed from a non-expendable pattern and may incorporate a preformed core element.

Such molds may be prepared from a slurry containing a refractory and a binding agent such as hydrolysed ethyl silicate. This slurry may be used to invest an expendable pattern or alternatively the slurry may be poured round a non-expendable mold pattern, which is removed by some mechanical means when the slurry has set.

The present invention seeks to provide an improved process which may be found particularly suitable for the preparation of molds or cores having increased strength.

According to the present invention a method of manufacturing a mold or core for use in metal casting comprises forming a mold or core structure from a refractory material which is moistened with an aqueous solution of sodium or potassium silicate and hardened by the action of carbon dioxide, applying to the hardened refractory structure at least one thermosetting resin, and hardening the resin by application of heat.

The thermosetting resin may be dissolved in a volatile solvent in which case the heat may be applied by combustion of the volatile solvent itself or alternatively the solvent may be allowed to evaporate at room temperature or be driven off by the application of heat from an external source. The hardening of the resin may in certain cases be effected with the application of pressure simultaneous with the heating.

One suitable resin is an unsaturated polyester resin with which may be incorporated other ethylenically unsaturated compounds such as styrene or methyl methacrylate.

The application of the resin solution can conveniently be effected by dipping or spraying. It has been found satisfactory to make one application of the resin solution and thereafter to burn off the solvent; this process may in certain cases be repeated. Phenol formaldehyde resins have been found satisfactory for use in accordance with the present invention. Other suitable resins are of the urea formaldehyde and melamine types. A suitable solvent for such resins is isopropyl alcohol. Other solvents such as acetone, ethyl alcohol and methyl alcohol may be used. The preferred resins are unsaturated polyester resins for which a suitable solvent is benzene, and phenol-formaldehyde resins which are soluble in ethyl alcohol or isopropyl alcohol.

The invention enables a mold or core to be produced having high strength before firing; this in the case of cores permits the incorporation of the core in a die in which an expendable wax, polystyrene or frozen mercury pattern is formed by the introduction of the pattern material. In the case of a mold, high strength prior to firing provides rigidity, minimising distortions which would present inaccuracies in the cast part.

It has been found that the addition of sugar to the aqueous solution of sodium or potassium silicate accelerates the hardening action by carbon dioxide, and preferred methods according to the present invention use such an accelerator. A convenient amount of sugar is up to 5 percent by weight of the silicate solution. An amount of about 2½ percent is preferred. The preferred sugar is cane sugar.

The sodium silicate solution may be prepared by dissolving solid sodium silicate in water. This may take place during mixing with the refractory material. A suitable solid sodium silicate is sodium metasilicate pentahydrate, which should be powdered to increase its rate of solution in water. If desired, the water may contain sugar in solution, a convenient amount being up to 30 percent by weight. It will be observed that more sugar is necessary if the sodium silicate solution is prepared by dissolving solid sodium silicate in water.

In order to give increased strength of mold or core when fired, a stable silica sol may be incorporated in the sodium or potassium silicate solution. One such silica sol is that known under the British registered trademark "Syton" as "Syton 2X."

In addition or alternatively it may be desirable to apply hydrolysed ethyl silicate to the mold or core structure before or after the hardening of the resin such application of hydrolysed ethyl silicate may conveniently be effected by dipping or spraying and is useful for increasing the strength of the mold or core when fired.

Preferably such ethyl silicate is hydrolysed under acid conditions.

In the methods according to the present invention, the mold or core will normally be fired in the process of preparing the mold for casting, for example in the range of 700° to 1000° C. In this manner it has been found that a mold or core having excellent strength properties can be obtained. A core may be fired in this manner before it is incorporated in a die used to form an expendable pattern by introduction of expendable pattern material such as wax into the die.

In one preferred method of applying the invention for the manufacture of molds for precision casting processes a refractory mold structure is formed around an expendable pattern such as a wax pattern, by ramming the refractory moistened with sodium or potassium silicate around the pattern which is supported within an outer casing. After hardening by forcing $CO_2$ gas into the damped refractory, the hardened refractory structure is removed from the casing and has the resin solution applied thereto to absorb the latter with subsequent burning off of the solvent. Advantageously, the silicate solutions used may contain sugar.

Likewise in the formation of cores, the damped refractory may be compacted in a split die into which carbon dioxide is passed to harden the refractory; thereafter the refractory core structure is removed from the die, and has the resin solution applied thereto with subsequent burning off of the solvent. Alternatively, the solvent may be allowed to evaporate, and the resin cured by the application of heat, with or without the simultaneous application of pressure.

Carbon dioxide reacts with sodium and potassium silicate in the refractory mix, to give silica and sodium or potassium carbonate, thereby binding the refractory structure which is of a porous nature capable of absorbing the resin solution. The hardening of the resin increases the low-temperature strength of the resultant mold or core prior to firing.

A suitable commercially available aqueous sodium silicate solution has the following properties:

| | | |
|---|---|---|
| Na$_2$O | percent by weight | 15.2 |
| SiO$_2$ | do | 30.4 |
| Molecular ratio, SiO$_2$/Na$_2$O | | 1:2.05 |
| Density at 20° C. | | 1.56 |
| Viscosity at 20° C. | centipoises | 900 |

A commercially available aqueous potassium silicate solution has a K$_2$O:SiO$_2$ ratio of 1:2.0 by weight, with a specific gravity of about 1.3.

It has been found that using such commercially available silicate solutions, refractories can be satisfactorily damped for use in accordance with the invention by adding about 3 percent or more up to 10 percent by weight of the solution in the weight of the refractory mix.

Various refractories may be used, one preferred refractory being zircon. Zircon is of a highly refractory nature, has relatively low expansion on heating, and has been found to give strong molds.

Other refractories which are preferred are silica alumina, sillimanite, and calcined fireclay grog having an alumina content of at least 40%.

A sieve analysis of one particular mixture of zircon sand and zircon flour used in methods according to the present invention is as follows (the sieve numbers quoted being in accordance with British Standard Specification 410 of 1943):

| Sieve No.: | Percent retained |
|---|---|
| 44 | 0.1 |
| 60 | 0.4 |
| 100 | 19.9 |
| 150 | 61.5 |
| 200 | 7.2 |
| 300 | 0.6 |
| Pass 300 | 10.1 |

In making up an investment material, zircon refractory according to the above analysis comprises approximately 90–97 percent (by weight) of the mix, whilst sodium or potassium silicate solution with sugar such as those mentioned represents the remainder.

In another method of making up an investment material, 100 parts by weight of zircon refractory according to the above analysis are mixed with two parts by weight of finely powdered sodium metasilicate pentahydrate, and two parts by weight of an aqueous sugar solution containing 25 percent by weight of cane sugar. Mixing should continue until the refractory material is thoroughly damped.

In order to give increased strength to the mold or core after firing, a stable silica sol may be added to the silicate solution. Thus in one preferred process according to the invention sodium silicate solution is made up as follows:

*Stage 1.*—200 gms. of stable silica sol sold under the registered trademark "Syton" as "Syton 2X" are added to 20 gms. of sugar.

*Stage 2.*—To 300 ml. of the commercially available sodium silicate solution specified above are added 100 ml. of "Syton 2X" and sugar solution prepared in stage 1 above. It is essential to stir vigorously during this addition.

This sodium silicate solution is then added to damp a refractory according to the above sieve analysis, 3 percent to 10 percent of the solution by weight being used in 97 percent to 90 percent by weight of refractory.

In another preferred process according to the invention potassium silicate solution is made up as follows:

*Stage 1.*—20 gms. of sugar are dissolved in 200 ml. of a stable silica sol sold under the British registered trademark "Syton" as "Syton 2X."

*Stage 2.*—To 300 ml. of aqueous potassium silicate solution specified above are added 100 ml. of the "Syton 2X" and sugar solution prepared in stage 1 above. It is essential to stir vigorously during this addition.

Syton 2X is a silica aquasol having the following properties:

| | | |
|---|---|---|
| Silica content | percent | 30 |
| pH | | 10.0 |
| Average particle diameter 250 A. | | |

Where the invention is used to form a mold around an expendable pattern, the latter may be given an initial coating of a fine refractory-bound material, e.g. by spraying or dipping, one of the known coating compositions being used. Such coating may be dusted with a coarse refractory before investment, and may be strengthened by dipping in acid hydrolysed ethyl silicate solution, as described in our co-pending British application No. 3,136/54 and the corresponding U.S. application 483,164 filed January 20, 1955, now abandoned.

An example of a resin solution is as follows:

| | | |
|---|---|---|
| Benzene | ml | 5 |
| Styrene (monomer) | ml | 11 |
| Unsaturated polyester resin | ml | 45 |
| Catalyst | gms | 3.25 |
| Accelerator | ml | 2 |

In the above composition benzene is the volatile solvent. An alternative composition, free of solvent, is:

| | | |
|---|---|---|
| Styrene (monomer) | ml | 40 |
| Unsaturated polyester resin | ml | 60 |
| Catalyst | gms | 2 |

In each case hardening is completed by heating for 10–15 hours at 40–50° C. The catalyst in each composition is a paste comprising 60% by weight of cyclohexanone peroxide and 40% by weight of tricresyl phosphate. The accelerator is a saturated solution of cobalt naphthenate in white spirit. One method of obtaining unsaturated polyester resins is to react a polyhydric alcohol such as ethylene glycol, or glycerol, with an unsaturated organic acid such as maleic acid, or with an unsaturated organic anhydride such as maleic anhydride.

Another unsaturated polyester resin composition, free of solvent, is:

| | Ml. |
|---|---|
| Unsaturated polyester resin | 300 |
| Methyl methacrylate | 50 |
| Styrene | 30 |

Before use, add 12 ml. of butyl perbenzoate to 350 ml. of the above composition. Hardening is completed by heating for 15–24 hours at 70° C.

Another example of a resin solution is:

| | Percent by weight |
|---|---|
| Spirit soluble phenol-formaldehyde resin | 10 |
| Ethyl alcohol, or isopropyl alcohol | 90 |

Hardening of the resin may be completed by burning off the solvent. This solution is particularly suitable for use where more than one application is desired.

It will be understood that in the case of a mold formed around a wax pattern the burning off of the solvent if such a solvent is used and burnt off will normally result in the removal of the wax, final traces of the wax being removed by firing, for example in the range of 700° to 1000° C.

Preformed refractory cores made according to the present invention can be incorporated in the expendable pattern prior to firing which is then invested according to the process of this invention or in an alternative investment material such as the known hydrolysed ethyl silicate bound refractory. Alternatively, the pattern with the core incorporated therein may be invested by a dipping process as for example described in United States application Serial No. 376,243, filed August 24, 1953, now U.S. Patent No. 2,806,269 granted to Adam Dunlop, September 17, 1957.

By the expression "a stable silica sol" used in this specification there is meant a stable substantially electrolytefree colloidal dispersion of silica in water, sometimes referred to as a "silica aquasol."

We claim:

1. A method of manufacturing, for casting metals, a high strength before firing mold structure from a refractory material which includes moistening finely divided refractory material with from 3 to 10 percent of its weight of an aqueous solution of a silicate of a metal selected from the group consisting of potassium and sodium, forming a mold structure therefrom, hardening the same throughout by the action of carbon dioxide, applying to the surfaces of the hardened refractory structure a non-aqueous solution of at least one thermo-setting resin and hardening the resin by the application of heat to the structure, and then firing the mold structure at a temperature in the range of 700° to 1000° C.

2. The method claimed in claim 1 in which the thermosetting resin is dissolved in a volatile solvent.

3. The method claimed in claim 1 in which the silicate solution contains sugar as a hardening accelerator up to an amount equalling 5 percent by weight of the silicate solution.

4. The method claimed in claim 1 in which up to 30 percent by volume of a stable silica sol is incorporated in the silicate solution.

5. The method claimed in claim 1 in which the resin is applied as a solution in benzene of styrene resin (monomer), a larger quantity of unsaturated polyester resin and a catalyst.

6. The method claimed in claim 1 in which the resin solution comprises a phenol-formaldehyde resin dissolved in a solvent selected from the group comprising methyl alcohol, ethyl alcohol, and isopropyl alcohol.

7. A mold structure for casting metals formed by the method claimed in claim 1.

8. The method claimed in claim 2 in which the solvent is flammable and the heat to cure the resin is supplied by burning off the solvent.

9. The method claimed in claim 5 in which the catalyst is butyl perbenzoate.

10. The method claimed in claim 5 in which the resin composition includes methyl methacrylate.

11. The method claimed in claim 5 in which the catalyst is a mixture of cyclo-hexone peroxide and tricresyl phosphate.

12. A method of manufacturing a mold for casting metals comprising forming an expendable pattern, coating the expendable pattern with an initial refractory coating, investing the coated pattern with refractory material which is moistened with an aqueous solution of a silicate of a metal selected from the group consisting of potassium and sodium, which solution forms only a small percentage of the mixture, forming a refractory mold structure therefrom, hardening the same by the action of carbon dioxide, applying to the hardened refractory structure a non-aqueous solution of at least one thermosetting resin, and hardening the resin by application of heat.

References Cited in the file of this patent

UNITED STATES PATENTS

| | | |
|---|---|---|
| 2,313,674 | Salzberg et al. | Mar. 9, 1943 |
| 2,380,945 | Collins | Aug. 7, 1945 |
| 2,391,855 | Bean | Dec. 25, 1945 |
| 2,521,839 | Feagin | Sept. 12, 1950 |

FOREIGN PATENTS

| | | |
|---|---|---|
| 8,180 of 1911 | Great Britain | Sept. 19, 1911 |
| 11,568 of 1884 | Great Britain | Aug. 23, 1884 |
| 15,619 of 1898 | Great Britain | Apr. 15, 1899 |
| 688,652 | Great Britain | Mar. 11, 1953 |
| 710,099 | Great Britain | June 9, 1954 |
| 716,394 | Great Britain | Oct. 6, 1954 |
| 741,381 | Great Britain | Nov. 30, 1955 |
| 745,402 | Great Britain | Feb. 22, 1956 |

OTHER REFERENCES

"Hardening Sand with $CO_2$," Pursall et al., Foundry, March 3, 1956, pages 128–135.

"Drying Sand Cores," Calhoun et al., Metal Industry, Sept. 27, 1946, pages 267–268.

Precision Investment Casting, Chaps. 11 and 14, E. L. Cady, 1948.